United States Patent [19]
Sugawara et al.

[11] Patent Number: 5,866,423
[45] Date of Patent: Feb. 2, 1999

[54] MEASURING METHOD OF THE SPECIFIC SURFACE AREA AVAILABLE FOR REACTION OF NOBLE METAL CATALYST IN THE ELECTRODE OF POLYMER ELECTROLYTE MEMBRANE FUEL CELL

[75] Inventors: Yasushi Sugawara, Neyagawa; Makoto Uchida, Hirakata; Yuko Fukuoka, Kyoto; Nobuo Eda, Hirakata, all of Japan

[73] Assignee: Matsushita Electric Industrial Co., Ltd., Osaka, Japan

[21] Appl. No.: 783,577

[22] Filed: Jan. 15, 1997

[30]  Foreign Application Priority Data

Jan. 16, 1996 [JP] Japan .................................... 8-004570
Nov. 7, 1996 [JP] Japan .................................... 8-294722

[51] Int. Cl.$^6$ .................................................... G01N 15/08
[52] U.S. Cl. .................................. 436/5; 73/1.81; 429/40
[58] Field of Search ........................ 429/40–42; 73/1.81; 436/5

[56]  References Cited

U.S. PATENT DOCUMENTS 3,944,390  3/1976  Lieber .......................................... 436/5

Primary Examiner—Lyle A. Alexander
Attorney, Agent, or Firm—Ratner & Prestia

[57]  ABSTRACT

A measuring method for determining the specific surface area available for reaction of a noble metal catalyst of an electrode for use in a polymer electrolyte membrane fuel cell. The method includes measuring the total specific surface area of the noble metal catalyst and the specific surface area of the noble metal catalyst mixed with a polymer electrolyte by detecting the adsorption amounts of carbon monoxide upon exposure to carbon monoxide after reduction in hydrogen, and subtracting the latter from the former. Also provided is an electrode material for use in a polymer electrolyte membrane fuel cell having excellent polarization characteristics by controlling the utilization of a noble metal catalyst determined from the total specific surface area and specific surface area available for reaction of the noble metal catalyst. The electrode material includes a noble metal catalyst powder and a polymer electrolyte, wherein the utilization ratio of the noble metal catalyst is at least 40% of the saturation value of the utilization of the noble metal catalyst powder.

20 Claims, 2 Drawing Sheets

MEASURING METHOD OF THE SPECIFIC SURFACE AREA AVAILABLE FOR REACTION OF NOBLE METAL CATALYST IN THE ELECTRODE OF POLYMER ELECTROLYTE MEMBRANE FUEL CELL

FIELD OF THE INVENTION

The present invention relates to a measuring method of the specific surface area available for reaction of noble metal catalyst such as platinum (Pt) carried in powdered carbon such as graphite and acetylene black for forming the electrode used in fuel electrode (anode) and oxygen electrode (cathode) of polymer electrolyte membrane fuel cell (hereinafter called PEMFC) and a designing of catalyst layer for the electrode of the PEMFC defined by the utilization of the noble metal catalyst determined from this measured value.

BACKGROUND OF THE INVENTION

Fuel cells are intensively researched and developed in various types ranging from medium temperature to high temperature operating type, such as phosphoric acid fuel cell (PAFC), molten carbonate fuel cell (MCFC), and solid oxide fuel cell (SOFC), as power generation system applicable in wide uses from small-scale electric power generation to large plants, and practical use is promoted in some of them.

On the other hand, fuel cells designed for use in small-scale independent power supply or portable power supply that can operate at a relatively low temperature near an ordinary temperature are also researched and developed. As a typical example thereof, the alkaline fuel cell (AFC) is known well, and recently, the PEMFC using the polymer electrolyte (PE) such as Nafion (tradename) or other cation exchange membrane as hydrogen ion (proton) conductive material is drawing attention. In the PE of the PEMFC initially mounted on the manned spacecraft Gemini, styrene-divinyl benzene sulfonic acid group polymer membrane was used. However, since this membrane was likely to elevate in the internal resistance due to local dehydration phenomenon and low in heat resistance, it was replaced by Nafion. By repeated improvement of characteristic and reduction of cost, the PEMFC is not only used as the power supply aboard the spacecraft, but also noticed recently for consumer use such as driving power source of electric vehicle and boat and portable power supply.

In the PEMFC, pure hydrogen or reforming hydrogen from methanol or the like is used for the fuel as the reducing agent of the anode, and pure oxygen or oxygen in the air is used as the oxidizing agent of the cathode.

The electrode reaction at the fuel electrode (anode) side is $$H_2 \rightarrow 2H^+ + 2e^- \quad (1\text{-}1)$$

and therefore hydrogen is consumed. The electrode reaction occurring at the oxygen electrode (cathode) side is $$\tfrac{1}{2}O_2 + 2H^+ + 2e^- \rightarrow H_2O \quad (1\text{-}2)$$

and oxygen is consumed and water vapor is generated. The overall reaction is expressed as $$H_2 + \tfrac{1}{2}O_2 \rightarrow H_2O \quad (1\text{-}3)$$

and an electric power is generated.

Reactions of gas electrodes expressed in formulas (1-1) and (1-2) take place, as known well, in the three-phase zone near the three-phase interface in which reductive or oxidative gases, PE which is an ion conductive solid, and powdered carbon of electronic conductive solid on which the catalyst is carried contact with each other. As the electrode material in PEMPC, in both anode and cathode, powdered carbon is used such as graphite and acetylene black carrying Pt catalyst mixed with PE. As the catalyst metal of anode, iridium (Ir) may be used instead of Pt.

The gas electrode reaction in the anode and cathode occurs on the noble metal catalyst composed of Pt and/or Ir carried on powdered carbon, but all catalyst cannot contribute to the reaction. Only the catalyst porously covered with PE and is capable of contacting with reaction gas can contribute to the reaction. In other words, if contacting with reaction gas, the catalyst not covered with PE cannot contribute to the reaction. That is, when the specific surface area available for reaction is large in the noble metal catalyst porously covered with PE and allowing reaction gas to diffuse easily, polarization becomes smaller and the discharge characteristics of the electrode are enhanced.

The specific surface area available for reaction of noble metal catalyst is expressed in formula (2-1).

Specific surface area available for reaction of noble metal catalyst $(m^2 \cdot g^{-1})$ = total specific area of noble metal catalyst $(m^2 \cdot g^{-1})$ — specific surface area of noble metal catalyst not covered with PE $(m^2 \cdot g^{-1})$ ... (2-1)

Together with this specific surface area available for reaction of noble metal catalyst, the utilization of noble metal catalyst which is percentage of specific surface area available for reaction of total specific area of noble metal catalyst is an extremely important factor for designing of catalyst layer of PEMFC electrode.

$$\text{Utilization of noble metal catalyst (\%)} = \frac{\text{specific surface area available for reaction of noble metal catalyst } (m^2 \cdot g^{-1})}{\text{total specific area of noble metal catalyst } (m^2 \cdot g^{-1})} \times 100 \quad (2\text{-}2)$$

Hitherto, the total specific area of noble metal catalyst such as Pt was measured by first reducing the catalyst composed of powdered carbon on which the noble metal is carried by $H_2$ at 400° C., and then determining from the adsorption amount of carbon monoxide (CO). This method of measurement makes use of the nature that CO is adsorbed only on the Pt catalyst reduced by $H_2$, but there was a problem because the $H_2$ reducing temperature was set at 400° C. When using the noble metal carried catalyst as the electrode, PE was mixed, but as the PE which is an organic compound is decomposed in the reducing process, the value of measurement becomes inaccurate. To the contrary, in order to avoid decomposition of PE, if the $H_2$ reducing temperature is set too low, the total specific area of the catalyst becomes larger perhaps because CO adsorbs on the surface of other substance than the noble metal catalyst. It was hence necessary to select an appropriate $H_2$ reducing temperature.

Moreover, conventionally, the specific surface area available for reaction of noble metal catalyst was measured from the adsorption and desorption waves of hydrogen atom by cyclic voltammetric method in an electrolyte solution composed of, for example, diluted sulfuric acid ($H_2SO_4$), but using the electrode prepared by using powdered carbon carrying noble metal, according to formula 2-3.

$$S_{cv} = \frac{Q_{H(a)}}{W_{Pt} \cdot C} = \frac{Q_{H(a)}}{W_{Pt} \times 2.10} \quad (2\text{-}3)$$

where $S_{cv}$ [m$^2 \cdot$g$^{-1}$Pt]: specific surface area of Pt catalyst $Q_{H(a)}$ [C]: adsorption and desorption coulombic amount of hydrogen atom $W_{Pt}$ [g]: total Pt amount in electrode C [C·m$^{-2}$]: adsorption and desorption coulombic amount of hydrogen atom per 1 m$^2$ of surface area of Pt catalyst In the electrode for PEMFC, it is hard to cover the entire surface of the catalyst with PE which is, by nature, large in molecular diameter. The molecular diameter of the electrolyte in the electrolyte aqueous solution used in the conventional cyclic voltammetric method is smaller than that of PE and the permeability is high, and it permeates further and contacts even with the catalyst not contributing to reaction by nature because it is not covered with PE, and as a result the specific surface area available for reaction of the noble metal catalyst appears to be larger.

It is hence an object of the invention to present a novel measuring method capable of completely solving the problems of the conventional measuring methods described above. That is, without employing the conventional cyclic voltammetric method, by the CO adsorption method after H$_2$ reduction at specified temperature, the total specific area of the noble metal catalyst and the specific surface area of the noble metal catalyst not covered with PE and hence not contributing to the reaction are measured, the latter measurement is subtracted from the former measurement to determine the specific surface area available for reaction of the noble metal catalyst, and the catalyst layer of the PEMFC electrode defined according to the practical situation is designed depending on the utilization of the noble metal catalyst obtained therefrom, and the practical value is extremely large.

SUMMARY OF THE INVENTION

It is a first object of the invention to measure specific surface area available for reaction of the noble metal catalyst for PEMFC electrode. That is, according to this measuring method, noble metal catalyst powder such as Pt carried on powdered carbon, and electrode material powder mixing this noble metal catalyst powder and PE are reduced in H$_2$ in a range of 150° to 250° C., CO is adsorbed, the total specific area of the noble metal catalyst and the specific surface area of the noble metal catalyst not covered with PE are measured individually, and the latter measurement is subtracted from the former measurement, thereby determining the specific surface area available for reaction of the noble metal catalyst.

Furthermore, it is a second object of the invention to present an electrode excellent in polarization characteristics, by determining the utilization of noble metal catalyst which is percentage of specific surface area available for reaction of the noble metal catalyst in the total specific surface area of the noble metal catalyst, and forming the catalyst layer of PEMFC electrode, by an electrode material mixing catalyst carrying noble metal and PE so that this utilization may be at least 50% on the basis of the saturation of the utilization of the noble metal catalyst increasing as the PE ratio in the noble metal catalyst is increased.

Thus, the invention solves numerous demerits of the conventional measuring method completely, and enables to design the catalyst layer of PEMFC electrode on the basis of the measurement suited to the practical situation.

DETAILED DESCRIPTION OF THE PREFERRED EMBODIMENTS

Figure 1:
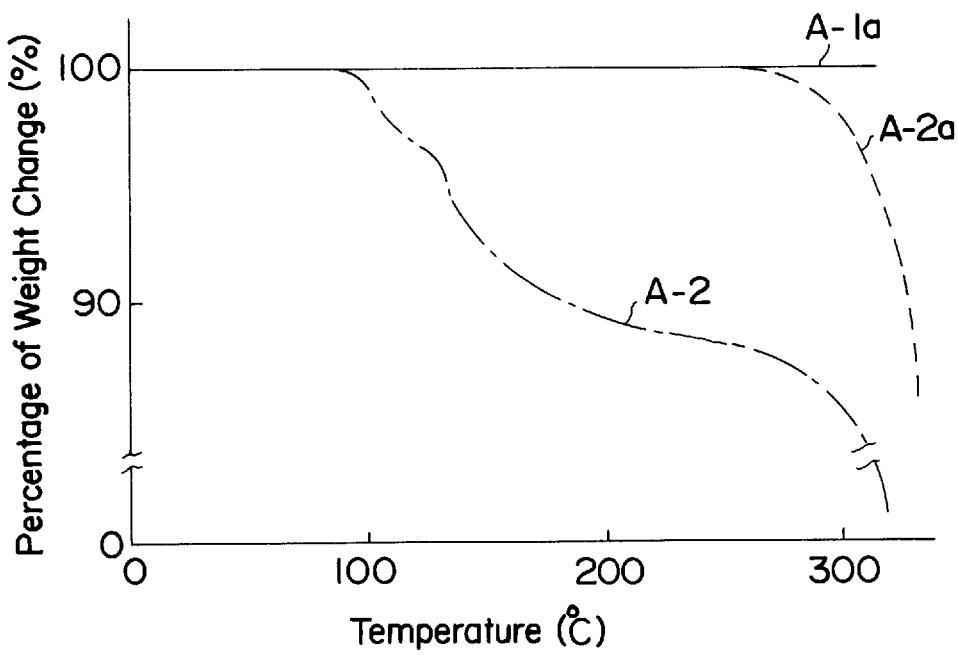
FIG. 1 shows the weight change curves of various powders by heating temperature.

Referring now to the drawings and tables, the invention is specifically described below by presenting embodiments.

Embodiment 1

Using powdered acetylene black (AB-A) as carrier, Pt is carried thereon by 10 to 30 wt. % according to the conventional method, and catalyst powder No. A-1 is prepared. This powder No. A-1 is dried in vacuum at 200° C. for 15 h, and powder No. A-1a is obtained.

On the other hand, a perfluorocarbon sulfonic acid group resin (Nafion) as PE-ethanol solution and n-butyl acetate are mixed and stirred, and a suspension of PE is prepared. The prepared suspension is adjusted of concentration so that the ratio by weight of PE and n-butyl acetate may be 1:60.

To this suspension of PE, powder No. A-1 is added, and dispersed by an ultrasonic mixer, and paste is prepared. In this case, the composition is adjusted so that the ratio by weight of catalyst Pt and n-butyl acetate may be 1:120. This paste is dried in air at room temperature, and ground to obtain powder No. A-2.

Powder No. A-2 is dried in vacuum at 200° C. for 15 h to obtain powder No. A-2a.

In powder Nos. A-1a, A-2 and A-2a, weight changes by heating temperature were determined by using thermobalance. Results are shown in FIG. 1.

As clear from FIG. 1, in powder No. A-2 which was prepared only by drying in air and grinding the paste composed of catalyst powder No. A-1 and PE suspension, a notable weight decrease was recognized around 100° C. and 130° C. These weight decreases were considered to be due to evaporation and removal of contained moisture and n-buytl acetate. By contrast, in powder Nos. A-1a and A-2a, weight decrease was not observed until around 250° C. It is considered because moisture and n-butyl acetate and other solvents have been removed by prior drying in vacuum at 200° C. for 15 h. However, in both powder Nos. A-2 and A-2a, the weight decreased obviously at over 250° C., It seems because, over 250° C., PE mixed with the dry catalyst powder (No. A-1A) is decomposed.

In measurement of specific surface area of noble metal catalyst such as Pt, since the sample weight is an important factor, a basic rule was determined to drying in vacuum until the weight of powder sample reaches a constant weight at temperature of over 130° C. in order to remove the contained moisture and solvent preliminarily, and at temperature of below 250° C. so that PE may not be decomposed by heat. Usually, a constant weight is reached in 15 h at around 200° C.

Embodiment 2

Heating powdered acetylene black (AB-A) in air atmosphere at several hundred degree centigrade, acetylene black (AB-B) forming multiple fine pores on primary particle surface is used as carrier, and same as in embodiment 1, paste of catalyst powder No. B-1 on which Pt is carried and PE suspension is dried in air at room temperature and ground to obtain electrode material powder No. B-2. Powder Nos. B-1 and B-2 are dried in vacuum at 200° C. for 15 h to obtain powder Nos. B-1A and B-2a.

In vacuum dried catalyst power Nos. A-1a and B-2a, and similarly vacuum dried electrode material powder Nos. A-2a and B-2a, the specific surface area of Pt catalyst was measured according to the method of the invention. Meanwhile, the specific surface area available for reaction of the Pt catalyst was also measured by conventional method by way of comparison.

The specific surface area of Pt catalyst of the invention was measured by using a gas adsorption measuring apparatus for catalyst (model No. R6015) of Okura Riken. At least 200 mg of sample powder is put in a glass U-tube sample container. The measuring precision can be improved by a greater sampling amount. First, at 150° to 250° C., $H_2$ is passed into the sample container, and the Pt catalyst surface is reduced and activated. Then, keeping the sample container at 50° C., 1.2 ml of CO is supplied into the sample container, and CO is adsorbed on the Pt catalyst. The amount of CO that was not adsorbed is determined by gas chromatography method. Such supply of CO and determination of CO not adsorbed are repeated until the CO supply amount and CO remaining amount are equal, and every adsorption amount of CO is cumulatively added, and the CO adsorption amount is determined. From the CO adsorption amount, the specific surface area of noble metal catalyst such as Pt is determined from formulas 2-4, 2-5 and 2-6.

$$V = \frac{V_t}{W_{Pt}} \cdot \frac{273}{273 + t} \quad (2\text{-}4)$$

where

V [ml·g$^{-1}$ Pt]: CO adsorption amount per 1 g of P1 in standard state $V_t$ [ml]: CO adsorption amount at measured temperature t° C.

$W_{pt}$ [g]: total Pt amount in sample powder $$K = \frac{V}{22.4 \times 10^3} \quad (2\text{-}5)$$

where K [mol·g$^{-1}$ Pt]: molar number of CO adsorbed per 1 g of Pt $$Sco = K \cdot N_A \cdot a^2 = 6.02 \times 10^2 \times (3.92 \times 10^{10})^2 \times K \quad (2\text{-}6)$$

where

Sco [m$^2$·g$^{-1}$ Pt]: specific surface area of Pt catalyst $N_A$: Avogadro's number a [angstroms]: lattice constant of Pt As mentioned above, the specific surface area available for reaction of Pt catalyst of the invention is determined by measuring the total specific area of Pt catalyst and specific surface area of Pt catalyst not covered with Pe by the CO adsorption method after $H_2$ reduction, and subtracting the latter from the former as shown in formula 2-1.

By contrast, the specific surface area available for reaction of Pt catalyst by the conventional method was measured in the following procedure. That is, a suspension of 20 to 60 wt. % of tetrafluoroethylene-hexafluoropropylene copolymer (FEP) is preliminarily applied on carbon paper (nonwoven cloth sheet by carbonizing polyacrylonitrile fiber), then dried and heat treated to obtain electrode base, and one side is coated with pastes of Pt catalyst powder Nos. A-1 and B-1 dispersed in PE suspension same as in embodiment 1 and dried to prepare an electrode. The paste was prepared in the composition of 1:120 of Pt catalyst and n-butyl acetate. One side of perfluorocarbon sulfonic acid (Nafion) membrane as PE layer was contacted by catalyst layer side of electrode each for a half cell, and both sides of Nafion membrane were contacted by catalyst layer side of two electrodes each for a test cell, then were integrated by a hot press at 200° C. and in the condition of pressure of 100 kg·cm$^{-2}$, and a half cell and a test cell were prepared, respectively.

The half cell was immersed in $1NH_2SO_4$ electrolyte, and the specific surface area available for reaction of Pt catalyst was obtained as the specific surface area Scv of Pt catalyst determined according to formula 2-3 from the adsorption and desorption waves of hydrogen atom by the cyclic voltammetric method with sweep speed of 1 mV·s$^{-1}$ from starting potential— 560 mV to reversing potential +420 mV on the basis of the Hg/HgSO$_4$ reference electrode.

Results are summarized in Table 1.

| Carrier | Type | AB-A | AB-B |
|---|---|---|---|
| | Specific surface area * (m$^2$·g$^{-1}$) | 58 | 835 |
| Total specific surface area of Pt catalyst (m$^2$·g$^{-1}$ Pt) | | 69.1 (No. A-1a) | 178.5 (No. B-1a) |
| Specific surface area available for reaction of Pt catalyst (m$^2$·g$^{-1}$ Pt) | Invention | 34.7 | 19.5 |
| | Prior art | 35.9 | 96.3 |
| Utilization of Pt catalyst (%) | Invention | 50.2 | 10.9 |
| | Prior Art | 52.0 | 53.9 |

In Table 1, the specific surface area * of acetylene black used in the catalyst carrier is the value measured by BET method by adsorption of nitrogen gas. The number in parentheses below the value of specific surface area of PT catalyst in the table refers to the powder number present for measurement.

Figure 2:
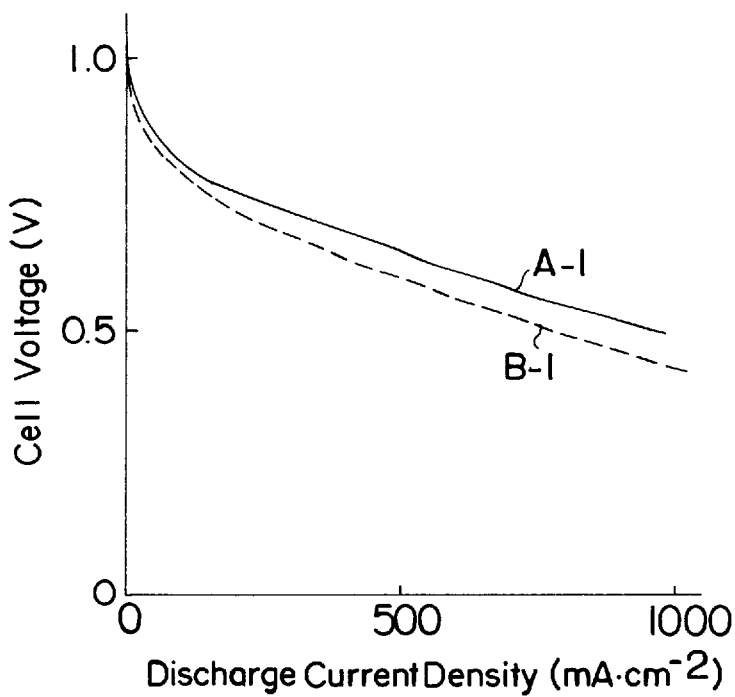
FIG. 2 is a comparative diagram of polarization characteristics of cells composed of electrodes using Pt catalyst using AB-A and AB-B as carrier.

Moreover, at anode side and cathode side of the test cell, pure $H_2$ and pure $O_2$ were supplied respectively, and polarization characteristics were measured. FIG. 2 comparatively shows the current density-voltage curve.

As known from Table 1, AB-B large in the specific surface area of carrier was large both in total specific surface area of Pt catalyst by CO adsorption method after $H_2$ reduction, and in available specific surface area of Pt catalyst by the conventional method. Accordingly, the utilization of Pt catalyst by the conventional method was relatively higher. From these results, the polarization characteristic of the test cell composed of the electrode using powder B-2 is expected to be improved, but the polarization characteristic in FIG. 2 presented a reverse result, that is, the polarization characteristic was superior in the test cell using the electrode formed by the paste using powder No. A-1, using AB-A of smaller specific surface area as carrier. The current density at 0.85 V in the activation polarization region was 45 mA·cm$^{-2}$ and 30 mA·cm$^{-2}$, respectively, in cells A-1 and B-1.

In Table 1, the specific surface area available for reaction of Pt catalyst obtained from the specific surface area value of Pt catalyst by CO adsorption method after $H_2$ reduction and its utilization are greater by nature when the AB-A of smaller specific surface area is used as carrier, which coincides with the result in FIG. 2.

When AB-B of an extremely wide specific surface area is used as the carrier, the Pt catalyst is developed up to the surface of multiple fine pores formed on the primary particle surface of acetylene black of carrier, so that the total specific area of the Pt catalyst is increased. However, although the Pt catalyst covered with PE of which molecular diameter is larger than that of $H_2SO_4$ electrolyte is considered to decrease, in the measuring method of specific surface area available for reaction of Pt catalyst by the conventional cyclic voltammetric method, $H_2SO_4$ permeates up to the Pt catalyst not covered with PE, and the adsorption and desorption coulombic amount of hydrogen atom is increased, and it seems that the specific surface area available for reaction of Pt catalyst was measured as a large value than actual size.

Embodiment 3

Preparing PE suspensions by varying the PE content, catalyst powder No. A-1 having 10 to 30 wt. % of Pt carried on powdered acetylene black (AB-A) is dispersed in PE suspensions at different PE concentrations same as in embodiment 1, and pastes PA-11, 12, 13 and 14 are prepared. In these pastes, the ratio by weight of Pt catalyst and n-butyl acetate was adjusted to a composition of 1:120 same as in embodiment 2.

Consequently, part of these pastes is dried in air at room temperature, and ground, and electrode material powder Nos. A-11, A-12 (same as No. A-2 in embodiment 1), A-13. and A-14 are obtained. These powders and catalyst powder No. A-1 are dried in vacuum at 200° C. for 15 h, and the specific surface area of Pt catalyst is measured by the method of the invention same as in embodiment 2, and the utilization is calculated from and obtained specific surface area available for reaction of Pt catalyst, of which result is shown in Table 2.

On the other hand, each paste is coated on one side of FEP treated carbon paper, and dried, and an electrode is prepared. Then, same as in embodiment 2, a test cell is prepared by integrating by hot press method by holding Nafion membrane of PE with catalyst layer side of two electrodes each, and polarization characteristic is measured. The result is shown in FIG. 3.

TABLE 2

| Paste No. | PA-11 | PA-12 | PA-13 | PA-14 |
|---|---|---|---|---|
| Paste composition (ratio b weight) | 1.0 | 1.0 | 1.0 | 1.0 |
| Pt catalyst | 1.6 | 2.0 | 2.4 | 4.0 |
| PE | 120 | 120 | 120 | 120 |
| n-Butyl acetate | | | | |
| Utilization of Pt catalyst (%) | 25 | 50 | 75 | 86 |

Figure 3:
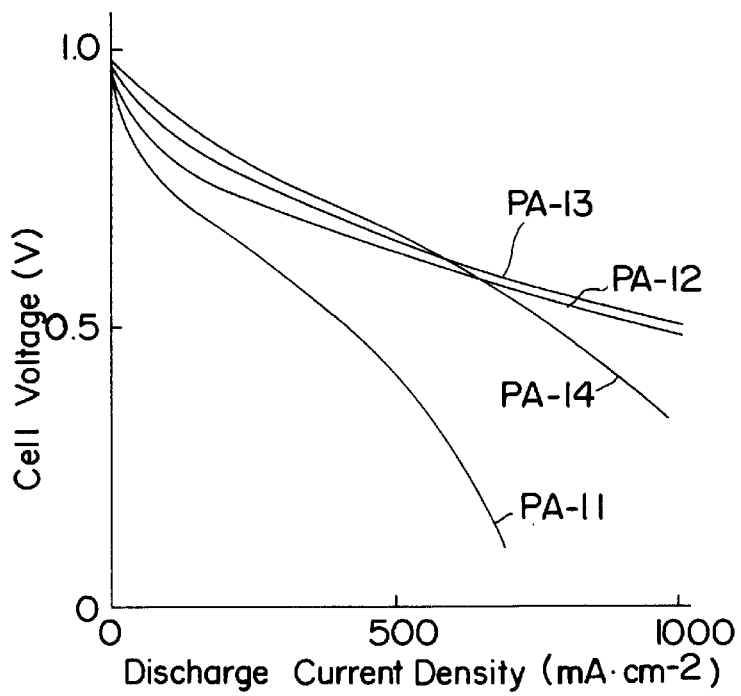
FIG. 3 is a comparative diagram of polarization characteristics of cells composed of electrodes at different PE contents.

From Table 2 and FIG. 3, it is understood that an excellent polarization characteristic is shown in the cell composed of electrodes made from paste PA-12, 13 and 14 with utilization of Pt catalyst of at least 50%. In the cell composed of electrode made from PA-11, it is considered that the polarization characteristic is low because the PE content in the electrode material is small and hence proton conductivity is insufficient. Besides, of the cells showing excellent polarization characteristics, the cell composed of the electrode made from PA-14 is high in utilization of Pt catalyst, but the cell voltage tends to be low in the region of high current density. This is considered because the PE amount is too large and diffusion of reaction gases are impeded although the specific surface area available for reaction of Pt catalyst is wide.

Figure 4:
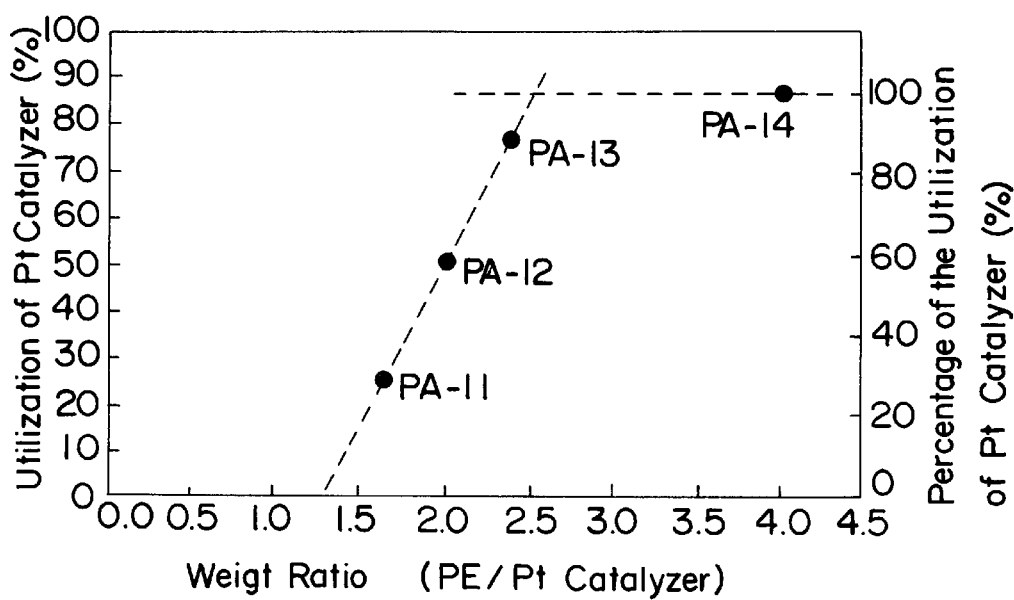
FIG. 4 is a change curve of Pt catalyst utilization by PE contents.

FIG. 4 shows plotting of utilization of Pt catalyst shown in Table 2 in terms of the ratio by weight of PE to Pt catalyst. It is known from FIG. 4 that the utilization of Pt catalyst is increased linearly along with increase of PE amount, and saturates near the ratio by weight of PE to Pt catalyst of about 2.4. In other words, the utilization of Pt catalyst saturates at a certain value (in FIG. 4, the utilization value at the ratio by weight of PE to Pt catalyst is 2.4), and if PE is added more, the utilization of Pt catalyst is not raised, but to the contrary, as mentioned above, if the PE content is excessive, diffusion of reaction gases are impeded, and the polarization characteristic of the cell deteriorates. It was confirmed in other experiment that it is essential to form the catalyst layer of PEMFC electrode by an electrode material mixing Pt carried catalyst and PE in the range of utilization of Pt catalyst of at least 40% to the saturation value, or at least at 50% on the basis of this saturation value.

As described specifically in the embodiments, the invention addresses demerits of the conventional method, and enables to design the catalyst layer of PEMFC electrodes by the parameter of measured values suited to practical situation.

The foregoing embodiments relate to Pt catalyst, but it is also applicable to other general noble metal catalysts such as palladium (Pd) and iridium (Ir) etc.

In the embodiments, moreover, acetylene black is used as the carrier, but it is not limited, and carbon black, graphite and others may be used either alone or mixture as the carrier.

Also in the embodiment, the PE is perfluorocarbon sulfonic acid resin (Nafion), but it can be generally applied to cation exchange resins, such as perfluorocarbon carboxylic acid resin, styrene divinyl benzene sulfonic acid resin, and styrene butadiene sulfonic acid resin and so on.

What is claimed:

1. A measuring method for determining a specific surface area available for reaction of a noble metal catalyst of an electrode material powder for a polymer electrolyte membrane fuel cell comprising the steps of:

reducing a first electrode material powder comprising a noble metal catalyst carried on powdered carbon, and reducing a second electrode material powder comprising a noble metal catalyst covered with polymer electrolyte carried on powdered carbon, exposing said first electrode material powder to carbon monoxide and measuring a total specific surface area of said noble metal catalyst of said first electrode material powder, said total specific surface area determined from the adsorption amount of carbon monoxide, exposing said second electrode material powder to carbon monoxide and measuring a specific surface area of said noble metal catalyst of said second electrode material powder, said specific surface area determined from the adsorption amount of carbon monoxide on said second electrode material powder, and subtracting the specific surface area of said noble metal catalyst of the second electrode material powder from the total specific area of said noble metal catalyst of the first electrode material powder to obtain the specific surface area available for reaction.

2. A measuring method according to claim 1, further comprising the step of calculating a percentage of specific surface area available for reaction of a noble metal catalyst to total specific surface area of noble metal catalyst to determine the utilization of a noble metal catalyst of an electrode material powder for a polymer electrolyte membrane fuel cell.

3. A measuring method according to claim 1, wherein said reducing steps are performed in hydrogen at 150° to 250° C.

4. A measuring method of specific surface area available for reaction of noble metal catalyst of electrode material powder for a polymer electrolyte membrane fuel cell of claim 1, further comprising the steps of drying said first electrode material powder and said second electrode material powder at 130° to 250° C. in vacuum.

5. A measuring method according to claim 4, further comprising the step of calculating a percentage of specific surface area available for reaction of a noble metal catalyst to total specific surface area of noble metal catalyst to determine the utilization of a noble metal catalyst of an electrode material powder for a polymer electrolyte membrane fuel cell.

6. A method for measuring a specific surface area of a noble metal catalyst available for reaction in an electrode material powder for use in a polymer electrolyte membrane fuel cell, the method comprising the steps of:
calculating a first amount of carbon monoxide adsorbed on a surface area of a noble metal catalyst of a first electrode material powder,
calculating a second amount of carbon monoxide adsorbed on a surface area of a noble metal catalyst of a second electrode material powder which comprises a polymer electrolyte, and
subtracting the second amount of carbon monoxide from the first amount of carbon monoxide to determine the specific surface area available for reaction of said noble metal catalyst in said second electrode material.

7. A method for measuring the specific surface area of a noble metal catalyst available for reaction in an electrode material powder for use in a polymer electrolyte membrane fuel cell as recited by claim 6, further comprising the step of
adsorbing carbon monoxide on said first and second electrode material powders.

8. A method for measuring the specific surface area of a noble metal catalyst available for reaction in an electrode material powder for use in a polymer electrolyte membrane fuel cell as recited by claim 4, further comprising the steps of reducing said first electrode material powder and said second electrode material powder at 150° to 250° C. in hydrogen prior to performing said calculating steps.

9. A method for measuring a specific surface area of a noble metal catalyst available for reaction in an electrode material powder for use in a polymer electrolyte membrane fuel cell, the method comprising the steps of:
providing a first noble metal catalyst powder and a second noble metal catalyst powder which are identical, said first and second noble metal catalyst powders comprising a carrier and at least one noble metal having a surface area which is at least partially exposed;
subjecting said first catalyst powder to the steps of:
reducing in hydrogen at a temperature between 150° to 250° C.;
adsorbing carbon monoxide on said exposed surface area of said noble metal of said first catalyst powder,
detecting the amount of carbon monoxide adsorbed to determine a total specific surface area of said noble metal of said first catalyst powder, and
dispersing said second noble metal catalyst powder in a polymer electrolyte on a carrier to provide an electrode material powder wherein said surface area of said noble metal provided by said second noble metal catalyst powder remains at least partially exposed;
subjecting said electrode material powder to the steps of:
reducing in hydrogen at a temperature between 150° to 250° C.,
adsorbing carbon monoxide on said exposed surface area of said noble metal of said electrode material powder,
detecting the amount of carbon monoxide adsorbed to determine a total specific surface area of said noble metal of said electrode material powder, and
subtracting said total specific surface area of said noble metal of said electrode material powder from said total specific surface area of said noble metal of said first catalyst powder to obtain the specific surface area available for reaction.

10. A method for measuring the specific surface area of a noble metal catalyst available for reaction in an electrode material powder for use in a polymer electrolyte membrane fuel cell as recited by claim 9, wherein said at least one noble metal is selected from the group consisting of platinum, palladium, iridium, and combinations thereof.

11. A method for measuring the specific surface area of a noble metal catalyst available for reaction in an electrode material powder for use in a polymer electrolyte membrane fuel cell as recited by claim 9, wherein said carrier is powdered carbon.

12. A method for measuring the specific surface area of a noble metal catalyst available for reaction in an electrode material powder for use in a polymer electrolyte membrane fuel cell as recited by claim 11, wherein said powdered carbon is selected from the group consisting of graphite, acetylene black, carbon black, and combinations thereof.

13. A method for measuring the specific surface area of a noble metal catalyst available for reaction in an electrode material powder for use in a polymer electrolyte membrane fuel cell as recited by claim 9, wherein said polymer electrolyte is a cation exchange resin.

14. A method for measuring the specific surface area of a noble metal catalyst available for reaction in an electrode material powder for use in a polymer electrolyte membrane fuel cell as recited by claim 13, wherein said cation exchange resin is selected from the group consisting of perfluorocarbon sulfonic, acid resin, perfluorocarbon carboxylic acid resin, styrene divinyl benzene sulfonic acid resin, and styrene butadiene sulfonic acid resin.

15. A method for measuring the specific surface area of a noble metal catalyst available for reaction in an electrode material powder for use in a polymer electrolyte membrane fuel cell as recited by claim 9, further comprising the steps of drying said first noble metal catalyst powder and'said electrode material powder at 130° to 250° C. in a vacuum prior to performing said reducing steps.

16. A method for measuring the specific surface area of a noble metal catalyst available for reaction in an electrode material powder for use in a polymer electrolyte membrane fuel cell as recited by claim 15 wherein said noble metal is selected from the group consisting of platinum, palladium, iridium and combinations thereof.

17. A method for measuring the specific surface area of a noble metal catalyst available for reaction in an electrode material powder for use in a polymer electrolyte membrane fuel cell as recited by claim 15, wherein said carrier is powdered carbon.

18. A method for measuring the specific surface area of a noble metal catalyst available for reaction in an electrode material powder for use in a polymer electrolyte membrane fuel cell as recited by claim 17, wherein said powdered carbon is selected from the group consisting of graphite, acetylene black, carbon black, and combinations thereof.

19. A method for measuring the specific surface area of a noble metal catalyst available for reaction in an electrode material powder for use in a polymer electrolyte membrane fuel cell as recited by claim 15, wherein said polymer electrolyte is a cation exchange resin.

20. A method for measuring the specific surface area of a noble metal catalyst available for reaction in an electrode material powder for use in a polymer electrolyte membrane fuel cell as recited by claim 19, wherein said cation exchange resin is selected from the group consisting of perfluorocarbon sulfonic acid resin, perfluorocarbon carboxylic acid resin, styrene divinyl benzene sulfonic acid resin, and styrene butadiene sulfonic acid resin.

* * * * *

UNITED STATES PATENT AND TRADE MARK OFFICE
CERTIFICATE OF CORRECTION

PATENT NO. : 5,866,423
DATED : February 2, 1999
INVENTOR(S) : Sugawara et al.

It is certified that error appears in the above-identified patent and that said Letters Patent is hereby corrected as shown below:

Column 9, line 44, delete "4" and insert --6--.

Column 10, line 45, after "sulfonic" delete the comma ",".

Column 10, line 52, after "and" delete the apostrophe " ' ".

Signed and Sealed this

Twenty-second Day of June, 1999

Q. TODD DICKINSON

*Attest:*

*Attesting Officer*     Acting Commissioner of Patents and Trademarks